United States Patent
Katayama et al.

(10) Patent No.: US 10,997,853 B2
(45) Date of Patent: May 4, 2021

(54) CONTROL DEVICE AND COMPUTER READABLE STORAGE MEDIUM

(71) Applicant: HONDA MOTOR CO., LTD., Tokyo (JP)

(72) Inventors: Mutsumi Katayama, Saitama (JP); Naohide Aizawa, Tokyo (JP); Yuji Nishikawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/536,330

(22) Filed: Aug. 9, 2019

(65) Prior Publication Data
US 2020/0051427 A1 Feb. 13, 2020

(30) Foreign Application Priority Data
Aug. 10, 2018 (JP) .............................. JP2018-151374

(51) Int. Cl.
*G08G 1/01* (2006.01)
*G06K 9/00* (2006.01)
*G08G 1/052* (2006.01)

(52) U.S. Cl.
CPC ....... *G08G 1/0133* (2013.01); *G06K 9/00798* (2013.01); *G06K 9/00805* (2013.01); *G08G 1/052* (2013.01)

(58) Field of Classification Search
CPC .. G08G 1/0104; G08G 1/0112; G08G 1/0141; G08G 1/0129; G08G 1/096716; G08G 1/0133; G08G 1/017; G08G 1/096775; G08G 1/164; G08G 1/0116; G08G 1/04; G08G 1/167; G08G 1/012; G08G 1/0125; G08G 1/096725; G08G 1/09675; G08G 1/096783; G08G 1/0969; G08G 1/00; G08G 1/0137; G08G 1/052; G08G 1/09; G08G 1/0962; G08G 1/09626; G08G 1/16; G08G 1/202; G08G 5/00; G08G 5/0069; G08G 1/20; G08G 1/005; G08G 1/096822; G08G 1/096844; G08G 1/123; G08G 1/127; G08G 1/148; G08G 1/205; G06T 2207/30252; G06T 3/005;
(Continued)

(56) References Cited

U.S. PATENT DOCUMENTS

2005/0099322 A1* 5/2005 Wainfan ............... G08G 1/0104
340/995.13
2006/0033615 A1* 2/2006 Nou ................. G08B 13/19647
340/539.13
(Continued)

FOREIGN PATENT DOCUMENTS

JP 2006031583 A 2/2006

*Primary Examiner* — Daniel Previl

(57) ABSTRACT

A control device is provided, which includes vehicle information collecting section configured to collect vehicle information that is sent by a vehicle and that includes location information indicating a location of the vehicle, a travelling situation determining section configured to determine a travelling situation of each of a plurality of vehicles including the vehicle based on a plurality of pieces of vehicle information including the vehicle information, and a captured-image receiving section configured to receive, from a vehicle in the travelling situation that satisfies a predetermined condition, a captured image captured by the vehicle.

20 Claims, 12 Drawing Sheets

(58) Field of Classification Search
CPC ..... G06T 3/0056; G06T 3/4038; G06T 5/006;
G06T 17/05; G06T 2215/16; G06T 7/00;
G06T 7/80; G06T 19/00; G06T
2207/10028; G06T 2207/10032; G06T
2207/20024; G06T 2207/30204; G06T
2207/30208; G06T 2207/30236; G06T
2207/30256; G06T 7/20; G06T 7/30;
G06T 7/50; G06T 7/70; G06T 7/73;
G06T 15/005; B60K 35/00; B60K
2370/152; B60K 28/066; B60K 2370/175;
B60K 2370/1868; B60K 2370/193; B60K
2370/566; B60K 28/06; B60W 2554/80;
B60W 50/14; B60W 30/18163; B60W
2420/42; B60W 2540/26; B60W 2554/00;
B60W 2556/50; B60W 2040/0872; B60W
2540/22; B60W 2540/221; B60W
2555/60; B60W 40/08; B60W 40/09;
B60W 10/04; B60W 2040/0818; B60W
2520/10; B60W 2520/105; B60W
2520/125; B60W 2552/00; B60W
2552/15; B60W 2554/801; B60W
2554/804; B60W 2710/18; B60W
2720/10; B60W 2720/106; B60W 10/18;
B60W 10/184; B60W 10/20; B60W
2040/0827; B60W 2050/0072; B60W
2050/143; B60W 2050/146; B60W
2420/52; B60W 2510/202; B60W
2540/18; B60W 2554/802; B60W
2555/00; B60W 2556/00; B60W 2556/45;
B60W 2710/20; B60W 2710/30; B60W
30/09; B60W 30/0953; B60W 30/0956;
B60W 30/12; B60W 30/143; B60W
30/182; B60W 40/06; B60W 60/00253;
H04N 7/18; H04N 7/181; H04N 5/2253;
H04N 5/23216; H04N 5/247; H04N
5/445; H04N 7/185; B60R 1/00; B60R
2300/105; B60R 2300/602; B60R 21/00;
G05D 2201/0213; G05D 1/0061; G05D
1/0088; G05D 1/0212; G05D 1/0244;
G05D 1/0246; G05D 1/0038; G05D
1/0217; G05D 1/0257; G05D 1/0274;
G05D 1/0276; G05D 1/0285; G05D
1/106; G05D 1/12; G05D 2201/0212;
G05D 1/0278; G05D 1/0287; G05D
1/0291; G01C 21/30; G01C 21/26; G01C
21/32; G01C 21/28; G01C 21/3492;
G01C 21/3602; G01C 21/00; G01C
21/20; G01C 21/34; G01C 21/3453;
G01C 21/3484; G01C 21/3644; G01C
21/3658; G01C 21/3691; G01C 21/3697;
G01C 21/3415; G01C 21/343; G01C
21/3438; G01C 21/3461; G01C 21/3647;
G06K 9/00791; G06K 9/00798; G06K
9/00818; G06K 9/00845; G06K 9/00825;
G06K 9/3258; G06K 9/4661; G06K
9/00228; G06K 9/0061; G06K 9/0063;
G06K 9/00838; G06K 9/00993; G06K
9/3241; G06K 9/00671; G01S 17/89;
G01S 7/4808; G01S 17/86; G01S 17/931;
G01S 19/07; G01S 7/4972; B08B 3/02;
B08B 7/02; B60Q 9/00; B62D 15/0255;
B62D 1/046; E01H 1/005; G06F 16/29;
G06F 3/011; G06F 3/012; G06F 3/013;
G06F 3/0346; G06F 3/0484; G06F
3/04842; G06F 3/0487; G06F 1/163;
G06F 3/04817; G06Q 40/08; G06Q
10/02; G06Q 10/047; G06Q 10/0631;
G06Q 50/30; G06Q 99/00; G09B 19/167;
G09B 29/00; G09B 29/10; A63F 13/00;
B64C 2201/127; B64C 2201/141; B64C
2201/146; B64C 2201/208; B64C 39/02;
B64C 39/024; B64D 47/08; G07C 5/085;
G07C 5/0891; G07C 5/008; B60N 2/002;
H04W 4/40; H04W 4/02; H04W 4/026;
H04W 4/027; H04W 4/38; G08B
13/19647; G08B 25/006; G08B 25/016;
F41G 3/147; G06N 20/00; H04L 67/12;
H04L 67/18
USPC ...... 340/934, 995.13, 936–938, 991–995.11,
340/995.19, 995.25, 426.22
See application file for complete search history.

(56) References Cited

U.S. PATENT DOCUMENTS

| | | | |
|---|---|---|---|
| 2016/0328959 A1* | 11/2016 | Liu | G08G 1/0175 |
| 2017/0032402 A1* | 2/2017 | Patsiokas | G06Q 30/0207 |
| 2017/0084175 A1* | 3/2017 | Sedlik | A61B 5/02055 |
| 2017/0192437 A1* | 7/2017 | Bier | G01C 21/28 |
| 2017/0205247 A1* | 7/2017 | Narayana | H04L 67/12 |
| 2018/0224296 A1* | 8/2018 | Suzuki | G06K 9/00798 |
| 2018/0286239 A1* | 10/2018 | Kaloyeros | G06K 9/00651 |
| 2019/0206258 A1* | 7/2019 | Chang | G01C 21/3438 |

* cited by examiner

CONTROL DEVICE AND COMPUTER READABLE STORAGE MEDIUM

The contents of the following Japanese patent application are incorporated herein by reference:
2018-151374 filed in JP on Aug. 10, 2018

BACKGROUND

1. Technical Field

The present invention relates to a control device and a computer readable storage medium.

2. Related Art

An on-vehicle system has been known which has means for accepting the setting of an observation site from a user, requesting another on-vehicle system to capture an image of the observation site, receiving the image of the observation site from the other on-vehicle system, and displaying the received image (for example, see Patent Document 1).

PRIOR TECHNICAL LITERATURE

Patent Document

[Patent Document 1] Japanese Patent Application Publication No. 2006-031583

SUMMARY

It is desirable to provide a technology that can receive, from a vehicle, a captured image that is useful for a user and present the received image to the user.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
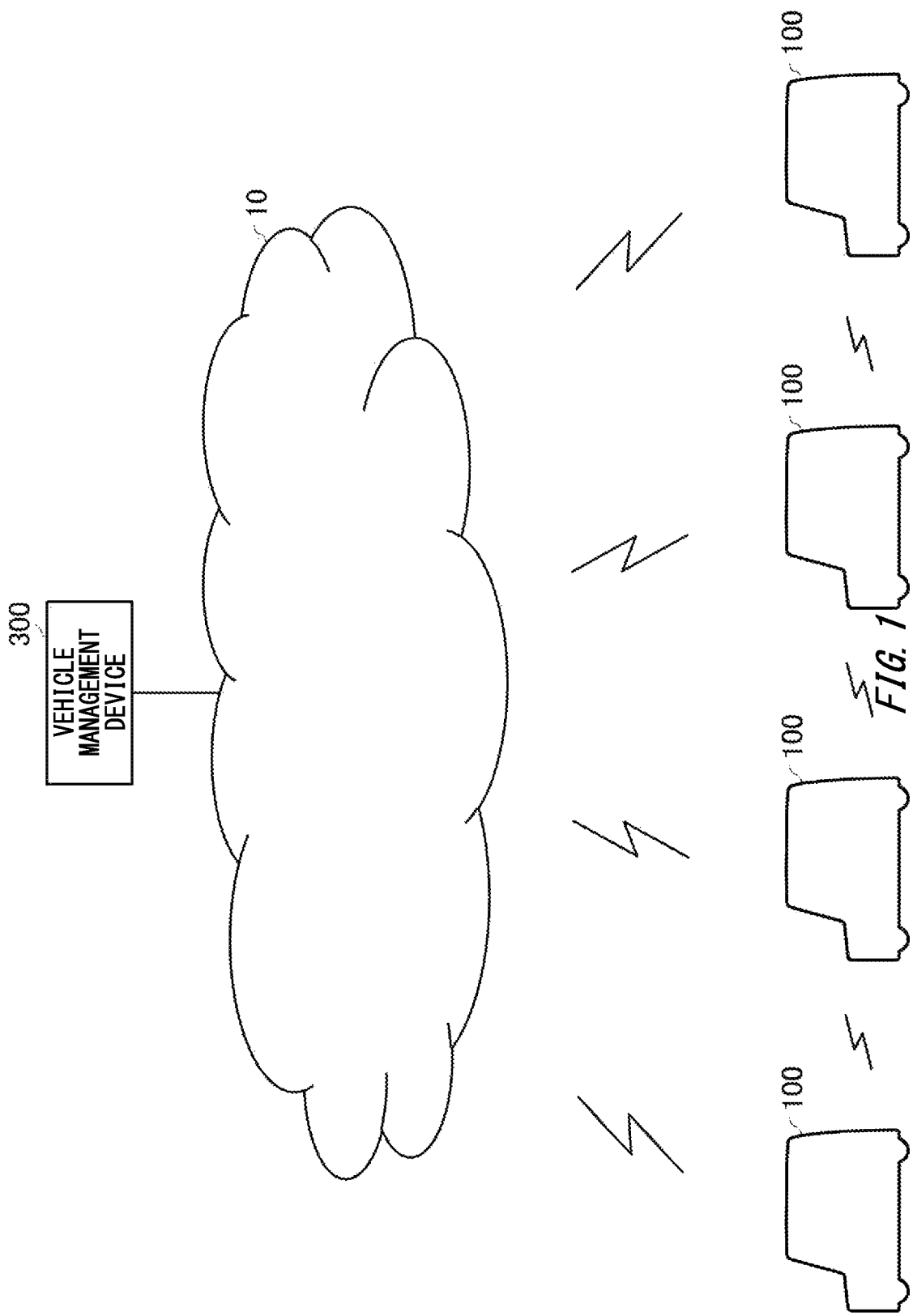
FIG. 1 schematically shows one example of a communication environment of a vehicle 100.

FIG. 1 schematically shows one example of a communication environment of a vehicle 100 according to the present embodiment. The vehicle 100 performs wireless communication with another vehicle 100. The vehicle 100 may perform wireless communication with another vehicle 100 in at least any form of: wireless communication with the other vehicle 100 via a network 10; direct wireless communication with the other vehicle 100 (which may be described as vehicle-vehicle direct communication); and wireless communication with the other vehicle 100 via road-vehicle communication (which may be described as vehicle-road-vehicle communication).

The network 10 may be any network. For example, the network 10 may include at least any of: the Internet; a mobile phone network such as so-called 3G (3rd Generation), LTE (Long Term Evolution), 4G (4th Generation) and 5G (5th Generation); a public wireless LAN (Local Area Network); and a private network.

The vehicle 100 may perform vehicle-vehicle direct communication or vehicle-road-vehicle communication by using any known vehicle-vehicle communication technology or road-vehicle communication technology. For example, the vehicle 100 performs vehicle-vehicle direct communication or vehicle-road-vehicle communication through communication utilizing a predetermined frequency band such as a 700-MHz band and a 5.8-GHz band. The vehicle 100 may also perform wireless communication with another vehicle 100 via yet another vehicle 100. For example, an inter-vehicle network may be formed by a plurality of vehicles 100 coordinating with each other through vehicle-vehicle direct communication or vehicle-road-vehicle communication, and vehicles 100 at remote locations may also perform communication via the inter-vehicle network.

The vehicle management device 300 manages a plurality of vehicles 100. The vehicle management device 300 may manage vehicle information of each of the plurality of vehicles 100. The vehicle information may include a location of a vehicle 100. The vehicle information may include an advancing direction and a travelling speed of the vehicle 100 (the travelling speed of a vehicle may be described as a vehicle speed). The vehicle information may include route information that indicates a route of the vehicle 100 to a destination. The vehicle management device 300 may periodically receive various vehicle information from the vehicle 100 via the network 10.

The vehicle 100 may receive the vehicle information from the vehicle management device 300. Also, the vehicle 100 may also receive, from another vehicle 100, the vehicle information via at least any one of vehicle-vehicle direct communication, vehicle-road-vehicle communication and an inter-vehicle network. The vehicle 100 grasps a situation of another vehicle by the receive vehicle information.

The vehicle 100 includes an image capturing section configured to capture an image of the surroundings of the vehicle 100, sends a captured image captured by the image capturing section to the another vehicle 100, and receives, from another vehicle 100, a captured image captured by an image capturing section of another vehicle 100. The captured image may be a still image or a video image (a moving image).

Here, for example, a case can be considered where current locations of a plurality of vehicles 100 are displayed on a map screen, and when a vehicle selection is accepted, a captured image captured by the selected vehicle 100 is received from the vehicle 100 and is displayed to a user. However, if a large number of vehicles 100 are displayed on the map screen, it may be troublesome for a user to select one vehicle 100 from among the large number of vehicles 100. Also, assuming a case where such a selection is performed by a user who is driving the vehicle 100, it is desirable that concentration of the user on driving is not disturbed.

The vehicle 100 according to the present embodiment determines travelling situations of a plurality of vehicles 100 based on pieces of vehicle information of the plurality of vehicles 100, and receives, from a vehicle 100 in a travelling situation that satisfies a predetermined condition, a captured image captured by the vehicle 100. Vehicle 100 receives a captured image from a vehicle 100 that is located within a head zone of traffic congestion, for example. Also, for example, the vehicle 100 receives, from a vehicle that travels on a parallel lane that is in parallel with a vehicle-line lane at which a line of vehicles is formed, a captured image that is obtained by capturing the line. Also, for example, the vehicle 100 receives a captured image from a vehicle that travels behind the traffic congestion. According to the above, a captured image useful for a user can be provided.

Figure 2:
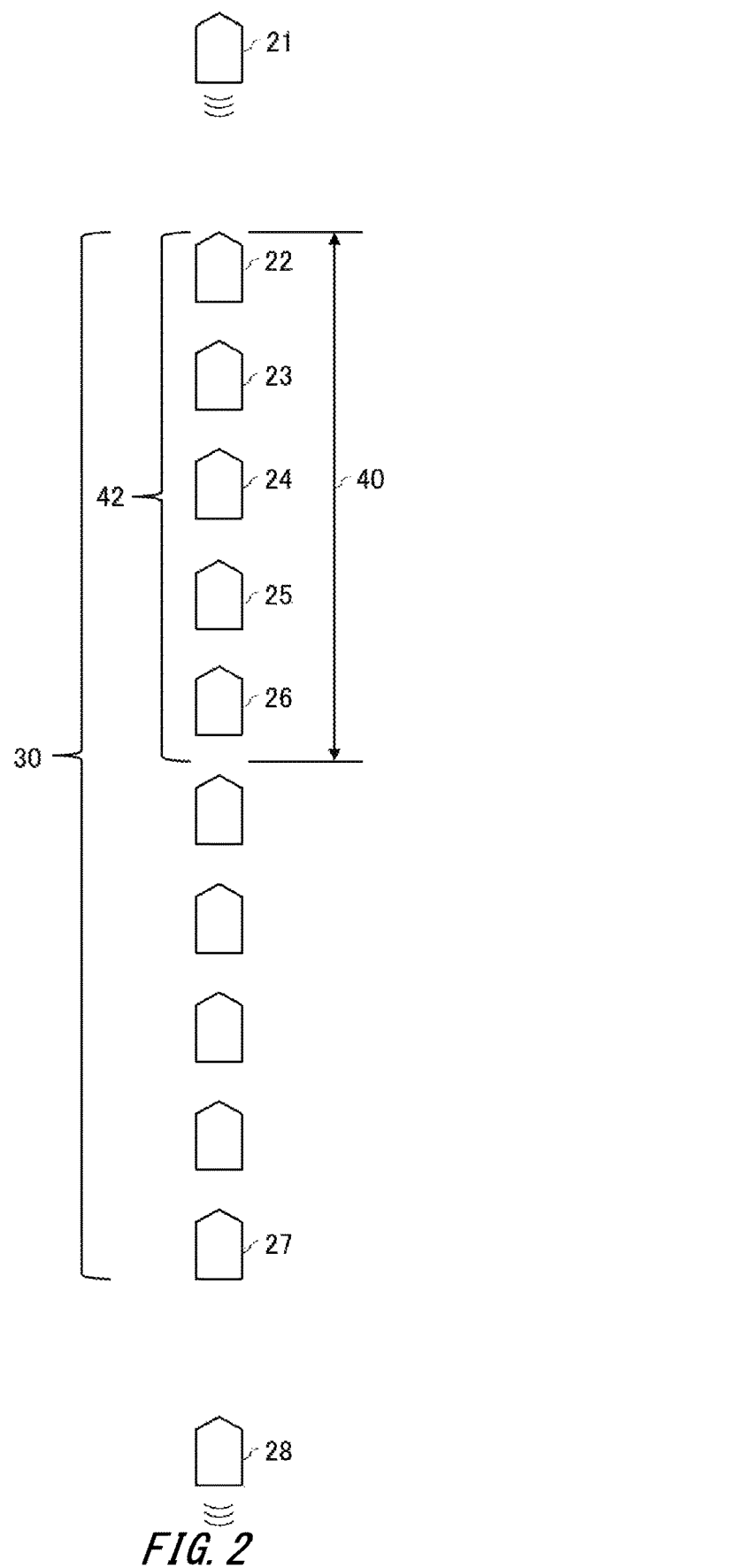
FIG. 2 schematically shows one example of traffic congestion.

FIG. 2 schematically shows one example of traffic congestion. In FIG. 2, a traffic congestion range 30 within which it is determined that traffic congestion exists, a vehicle 21 that passes through the traffic congestion range 30 and travels in front of the traffic congestion range 30, and a vehicle 28 that has traveled behind the traffic congestion range 30 and will reach the traffic congestion range 30 if keep advancing are shown.

In the present embodiment, the traffic congestion indicates that at the same lane there are a predetermined number or more of vehicles (for example, 15 vehicles if there is no traffic light) within an arbitrary predetermined distance (for example, 200 m if there is a traffic light or 100 m if there is no traffic light), and the highest value of vehicle speeds of vehicles that are within a zone of the arbitrary predetermined distance is approximately equal to or less than a predetermined speed (for example, 30 km/h).

A general distance between two vehicles (a distance between a read end of a preceding vehicle and a front end of the following vehicle) when the vehicles stop on a road is generally about an entire length of one vehicle, or when being equal to or less than the length, it is often secured to be at least around 1 m. When the distance is represented by a distance between vehicle heads (a distance between front ends of two vehicles), the distance is: in a case of light automobiles, approximately 7 m that is obtained by multiplying an entire length of the light automobiles by 2, and in a case of standard vehicles, approximately 8 m to 10 m that is obtained by multiplying an entire length of the standard vehicle by 2. That is, in a state in which there are 8 to 10 vehicles or more in a zone of a distance of 100 m, there is a high probability that almost all vehicles stop or travel as a so-called slow-and-go driving.

The distance between two vehicles during travelling is generally about 1 second to 2 seconds if represented by "time between two vehicles". A situation in which the time between two vehicles is less than 1 second (at least on a general road) can be said as a so-called "tailgating". When the vehicle speed km/h is converted into a speed per second m/sec, 30 km/h is 8.33 m/sec, 40 km/h is 11.1 m/sec, 50 km/h is 13.9 m/sec, and 60 km/h is 16.7 m/sec. If the distance between vehicle heads is represented by using this, for example, in a case where it takes 1 second between two vehicles (light automobiles) during travelling at 30 km/h, the distance is approximately 11.8 m; in a case where it takes 2 second between two vehicles (light automobiles) during travelling at 30 km/h, the distance is approximately 20.2 m; in a case where it takes 1 second between two vehicles (standard vehicles) during travelling at 30 km/h, the distance is approximately 13.3 m; and in a case where it takes 2 second between two vehicles (standard vehicles) during travelling at 30 km/h, the distance is approximately 21.7 m. That is, there are only 8 vehicles, or 8 vehicles or less within any zone of 100 m on a road on which the travelling speed is 30 km/h or more. However, another method for recognizing whether the line of vehicles is a traffic light waiting line or is caused by traffic congestion is necessary.

In the present embodiment, a head zone of traffic congestion may mean a zone where the vehicle will pass through the traffic congestion when advancing by a predetermined distance (for example, 100 m) within a range in which the traffic congestion exists. Also, in the present embodiment, a vehicle located within a head zone of the traffic congestion may be a vehicle that is located within a range of the traffic congestion but will be located in a location that is not in the traffic congestion range when advancing by a predetermined distance (for example, 100 m). Also, in the present embodiment, the head vehicle of the traffic congestion may be vehicle that has advanced to a location that is not the traffic congestion range among vehicles existing in the traffic congestion range. Also, in the present embodiment, a vehicle that travels on a parallel lane that is in parallel with a vehicle-line lane at which a line of vehicles is formed may be a vehicle that travels on a road including two lanes or more, where when one lane is in a traffic congestion range and the other lane is not in the traffic congestion range, the vehicle travels on the other lane. Also, in the present embodiment, a vehicle that travels behind the traffic congestion may be a vehicle that is within a range in which the traffic congestion does not exist but will reach the traffic congestion range if keeping advancing. Also, in the present embodiment, the end of the traffic congestion may be a vehicle in a range in which the traffic congestion exists, where a location right before the vehicle (the rear part of the advancing direction) is not the traffic congestion range or the vehicle has reached the location that is not the traffic congestion range.

For example, in the example shown in FIG. 2, in the traffic congestion range 30, a zone 42 at which the vehicle passes through the traffic congestion if advancing by a predetermined distance 40 is the head zone of the traffic congestion. Also, for example, in the example show in FIG. 2, vehicles 22, 23, 24, 25 and 26 that are within the traffic congestion range 30 bit will be located at a zone that is not the traffic congestion range 30 if advancing by the predetermined distance 40 are vehicles that are located within the head zone of the traffic congestion. Also, for example, in the example shown in FIG. 2, among vehicles existing in the traffic congestion range 30, the vehicle 22 that has advanced to a location that is not the traffic congestion range 30 is the head vehicle of the traffic congestion. Also, for example, in the example shown in FIG. 2, the vehicle 28 that is within a range in which the traffic congestion does not exist but will reach the traffic congestion range 30 if keep advancing is a vehicle that travels behind the traffic congestion. Also, for example, in the example shown in FIG. 2, the vehicle 27 that is in the traffic congestion range 30, where a location right before the vehicle 27 (the rear part of the advancing direction) is not the traffic congestion range 30 is the end of the traffic congestion.

Figure 3:
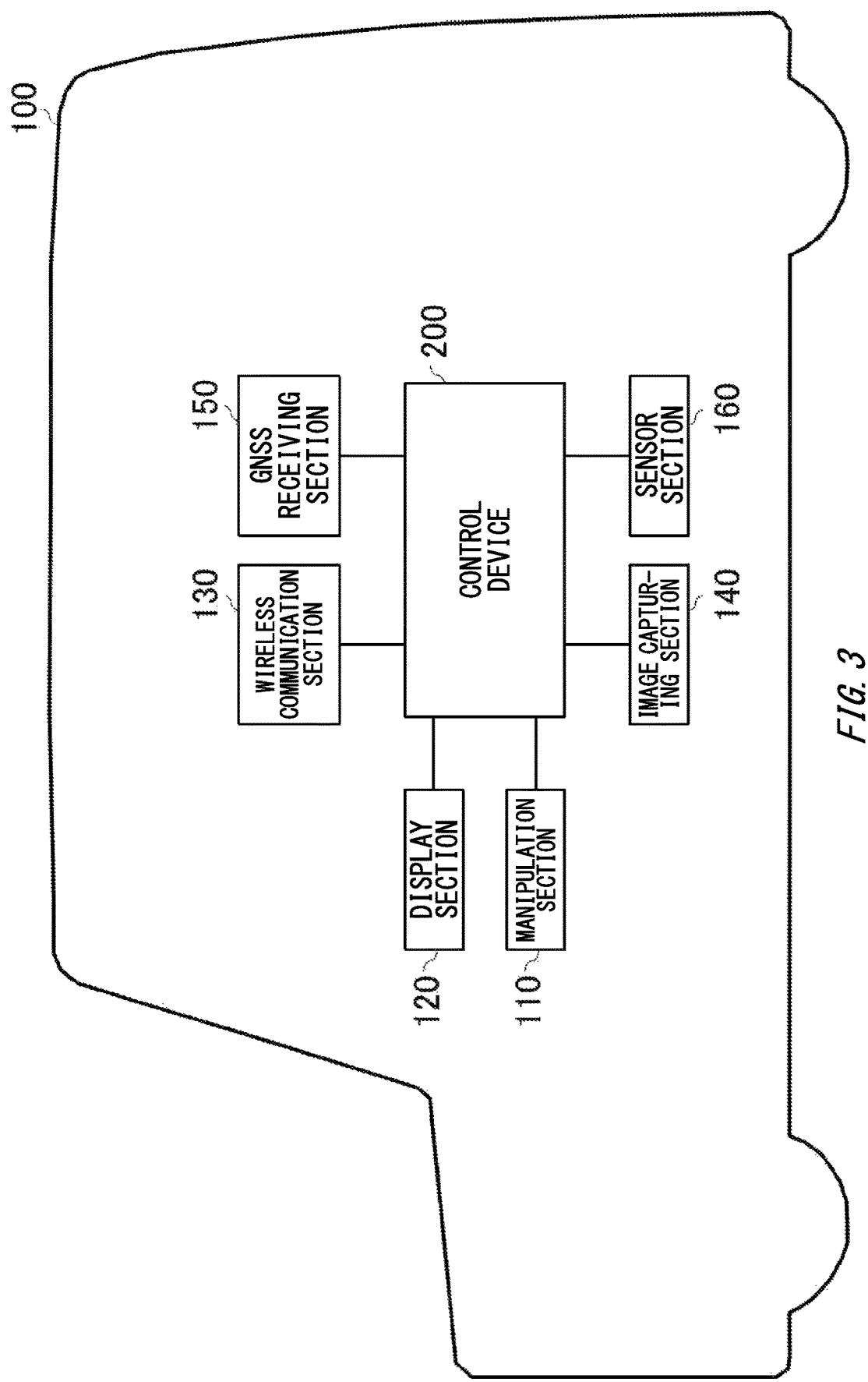
FIG. 3 schematically shows one example of a configuration of the vehicle 100.

FIG. 3 schematically shows one example of a configuration of the vehicle 100. The vehicle 100 includes a manipulation section 110, a display section 120, a wireless communication section 130, an image capturing section 140, a Global Navigation Satellite System (GNSS) receiving section 150, a sensor section 160 and a control device 200. At least a part of these components may be a component included in a so-called car navigation system.

The manipulation section 110 accepts a manipulation by a user of the vehicle 100. The manipulation section 110 may include physical manipulation buttons. The manipulation section 110 and the display section 120 may also be a touch panel display. The manipulation section 110 may also accept audio manipulation. The manipulation section 110 may include a microphone and a speaker.

The wireless communication section 130 performs wireless communication between the vehicle management device 300 and another vehicle 100. The wireless communication section 130 may include a communication section that performs communication with the network 10 via a wireless base station of a mobile phone network. Also, the wireless communication section 130 may include a communication section that perform communication with a network 10 via a Wi-Fi (registered trademark) access point. Also, the wireless communication section 130 may include a communication section that performs vehicle-vehicle communication. Also, the wireless communication section 130 may include a communication section that performs road-vehicle communication.

The image capturing section 140 includes one or more cameras. The camera may also be a drive recorder. When the image capturing section 140 includes a plurality of cameras, the plurality of cameras are respectively arranged on different positions of the vehicle 100. Also, the plurality of cameras respectively capture images in different image-capturing directions.

The GNSS receiving section 150 receives radio waves that are transmitted from a GNSS satellite. The GNSS receiving section 150 may also specify a location of the vehicle 100 based on a signal that is received from the GNSS satellite.

The sensor section 160 includes one or more sensors. The sensor section 160 includes, for example, an acceleration sensor. For example, the sensor section 160 includes an angular speed sensor (gyro sensor). For example, the sensor section 160 includes a geomagnetic sensor. For example, the sensor section 160 includes a vehicle speed sensor.

The control device 200 controls the manipulation section 110, the display section 120, the wireless communication section 130, the image capturing section 140, the GNSS receiving section 150, and the sensor section 160, to perform various processes. For example, the control device 200 performs a navigation process. The control device 200 may perform a navigation process similar to a navigation process performed by a known car navigation system.

For example, the control device 200 identifies a current location of the vehicle 100 based on outputs from the GNSS receiving section 150 and the sensor section 160, reads out map data corresponding to the current location, and causes the display section 120 to display the map data. Also, the control device 200 accepts the input of a destination via the manipulation section 110, identifies a recommended route from the current location of the vehicle 100 to the destination, and causes the display section 120 to display the recommended route. When accepting the selection of a route, the control device 200 performs guidance of a pathway to be traveled by the vehicle 100 via the display section 120 and the speaker according to the selected route.

The control device 200 according to the present embodiment collects vehicle information of a plurality of vehicles 100 other than a vehicle 100 (which may be described as a self-vehicle) on which the control device 200 is mounted. For example, the control device 200 receives the vehicle information that is periodically sent by a vehicle 100 other than the self-vehicle via at least one of the network 10 or the inter-vehicle network. Also, the control device 200 may receive the vehicle information of the plurality of vehicles 100 from the vehicle management device 300. The communication between the control device 200 and the outside the self-vehicle may be performed via the wireless communication section 130.

The control device 200 determines a travelling situation of each of the plurality of vehicles 100 based on a plurality of pieces of vehicle information. Further, the control device 200 receives, from a vehicle in a travelling situation that satisfies a predetermined condition, a captured image captured by the vehicle.

The control device 200 may send, to the vehicle that satisfies the predetermined condition, request information for requesting to send the captured image. The control device 200 may include identification information that indicates the self-vehicle in the request information and send the information. The identification information may be information by which the vehicle 100 can be identified during the communication. For example, the identification information is an ID and an IP address allocated to a vehicle 100, and the like. Further, the control device 200 may receive a captured image from a vehicle that has received the request information. The control device 200 displays the received captured image. The control device 200 may cause the display section 120 to display the received captured image.

Figure 4:
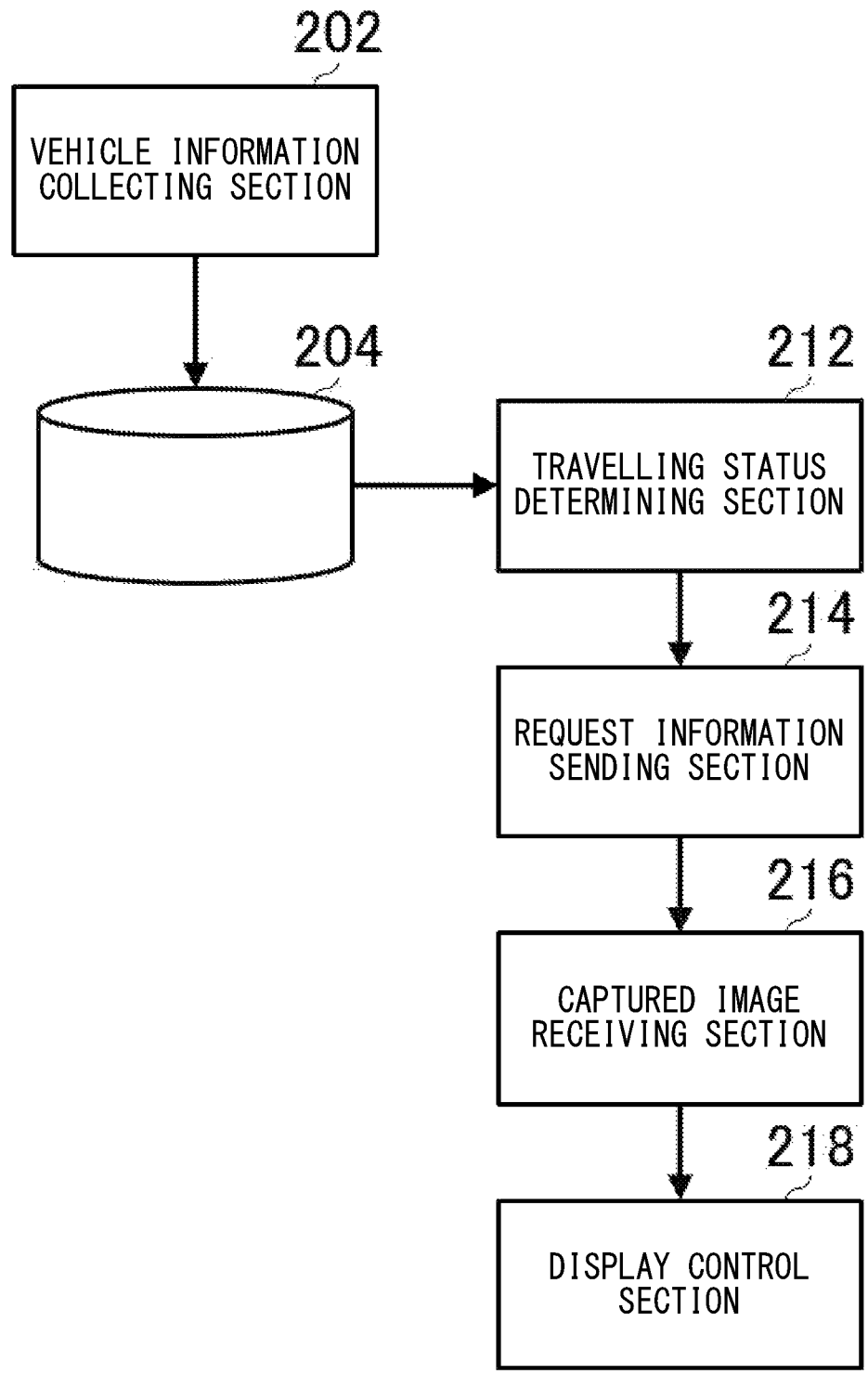
FIG. 4 schematically shows one example of a functional configuration of a control device 200.

FIG. 4 schematically shows one example of a functional configuration of the control device 200. The control device 200 includes a vehicle information collecting section 202, a storage section 204, a travelling situation determining section 212, a request information sending section 214, a captured-image receiving section 216 and a display control section 218. Note that the control device 200 does not necessarily include all of these components.

The vehicle information collecting section 202 collects the vehicle information. The vehicle information collecting section 202 may receive the vehicle information that is periodically sent by another vehicle 100. Also, the vehicle information collecting section 202 may also receive the vehicle information from the vehicle management device 300. The vehicle information collecting section 202 stores the collected vehicle information in the storage section 204.

The travelling situation determining section 212 determines travelling situations of a plurality of vehicles 100 based on the vehicle information stored in the storage section 204. The travelling situation determining section 212 may specify an advancing direction of the vehicles 100 from locations of the vehicles 100 for every time included in the vehicle information. Also, the travelling situation determining section 212 may specify travelling speeds of the vehicles 100 from locations of the vehicles 100 for every time included in the vehicle information. The advancing direction and the travelling speed may also be included in the vehicle information as described above. Also, the travelling situation determining section 212 may specify the advancing direction of the vehicles 100 from route information of the vehicles 100 included in the vehicle information.

For example, the travelling situation determining section 212 may specify an area in which the traffic congestion is occurring from locations, advancing directions, travelling speeds and the like of the plurality of vehicles 100. Note that the travelling situation determining section 212 may also specify an area in which the traffic congestion is occurring by receiving the congestion information from a traffic information distribution service or the like that distributes congestion information of each area via the network 10.

The travelling situation determining section 212 may specify a zone on which each vehicle 100 is travelling with respect to the traffic congestion. That is, the travelling situation determining section 212 may specify a relative location of each vehicle 100 relative to the traffic congestion. Further, the travelling situation determining section 212 may specify a vehicle that is located in the traffic congestion, a vehicle that is located within the head zone of the traffic congestion, a vehicle that is located at the end of the traffic congestion, a vehicle that travels behind the traffic congestion, a vehicle that travels on a parallel lane that is in parallel with a vehicle-line lane at which the traffic congestion is occurring, and the like.

The request information sending section 214 sends, to a vehicle in a travelling situation that is determined by the travelling situation determining section 212 and that satisfies a predetermined condition, the request information for requesting to send a captured image. The request information sending section 214 may include the identification information that indicates the self-vehicle in the request information, and send the information to the vehicle.

As examples of the predetermined condition, the followings are given: a vehicle that is located within a head zone of traffic congestion, a vehicle right before a head vehicle of the traffic congestion by a predetermined number of vehicles, a vehicle that travels on a parallel lane that is in parallel with a vehicle-line lane, a vehicle that travels behind the traffic congestion, a vehicle that travels right before the end of the traffic congestion by a predetermined distance or more, and the like. The predetermined condition is, for example, set by a user of a vehicle, and the like.

For example, the request information sending section 214 sends the request information to the vehicle 100 that is located within the head zone of the traffic congestion. For example, the request information sending section 214 sends the request information to the vehicle 100 that is located at the end of the traffic congestion within the head zone. Also, for example, the request information sending section 214 sends the request information to the vehicle that is right before the head vehicle of the traffic congestion by a predetermined number of vehicles.

For example, the request information sending section 214 sends the request information to the vehicle 100 that travels on the parallel lane that is in parallel with the vehicle-line lane at which a line of vehicles 100 is formed. Also, for example, the request information sending section 214 sends the request information to the vehicle 100 that travels behind the traffic congestion. The request information sending section 214 may send the request information to the vehicle that travels right before the end of the traffic congestion by the predetermined distance or more. The predetermined distance may be arbitrarily settable, and may also be changeable. The predetermined distance may be a distance along the shape of a road.

The captured-image receiving section 216 receives a captured image. The captured-image receiving section 216 receives a captured image that is sent by a vehicle according to request information, the vehicle having received the request information that is sent by the request information sending section 214. The display control section 218 may cause the display section 120 to display a captured image received by the captured-image receiving section 216. Also, the display control section 218 may also send the captured image to a pre-specified communication terminal and cause the communication terminal to display the captured image. As examples of the communication terminal, a mobile phone, such as a smart phone, a tablet terminal and the like that a user of the vehicle 100 owns can be shown.

Figure 5:
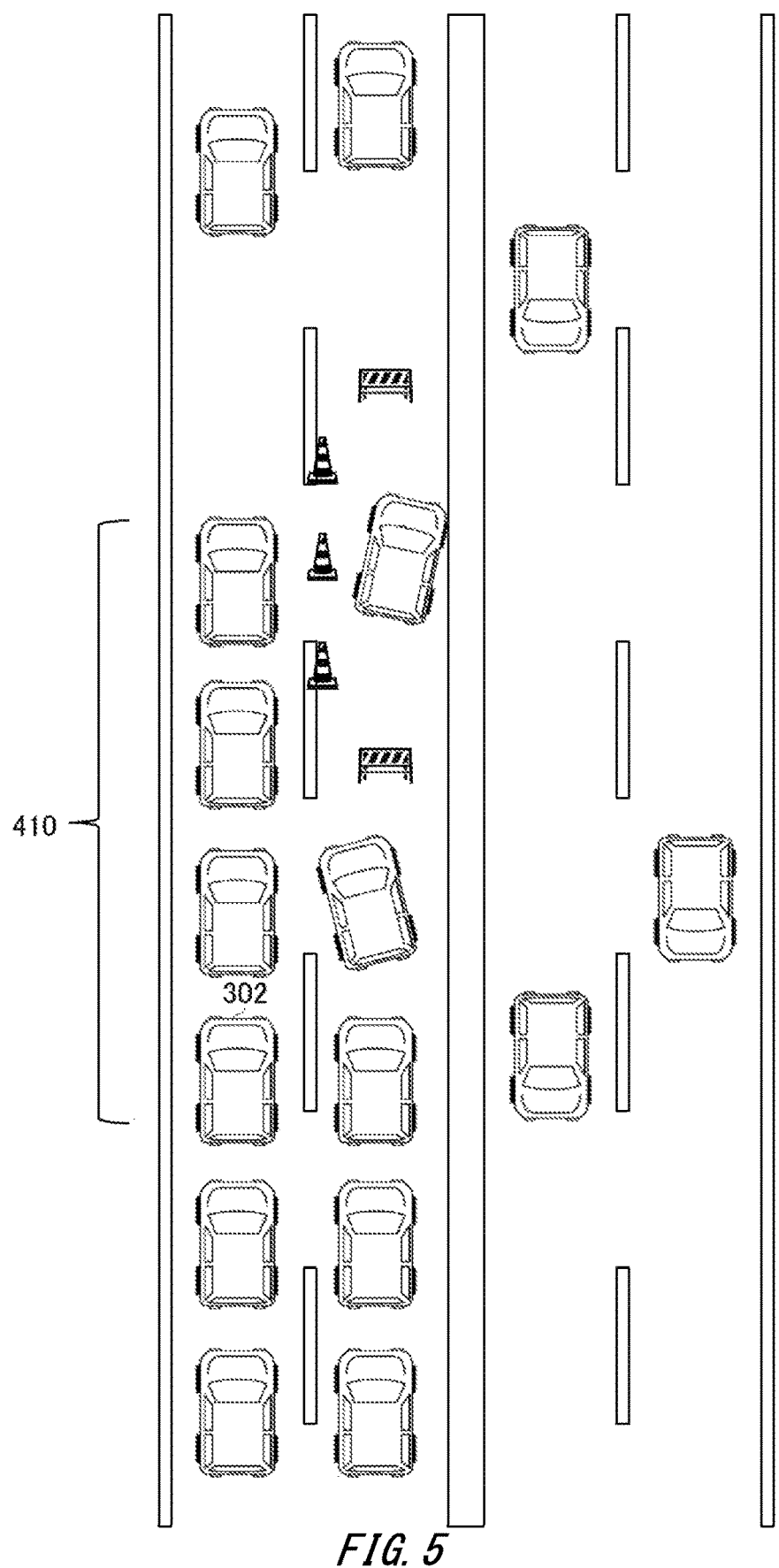
FIG. 5 schematically shows one example of a vehicle 302 that sends a captured image to the vehicle 100.

FIG. 5 schematically shows one example of a vehicle 302 that sends a captured image. In the example shown in FIG. 5, the vehicle 302 is located at the end of the traffic congestion within the head zone 410.

The request information sending section 214 may send the request information to the vehicle 302, and the captured-image receiving section 216 may receive the captured image from the vehicle 302. By causing the display section 120 to display the captured image received by the captured-image receiving section 216, the user can grasp a situation from a location slightly in front of the head of the traffic congestion, including a reason of the traffic congestion.

The request information sending section 214 may also send, to the vehicle 302, an instruction for stopping to send the captured image according to an instruction of the user of the vehicle 100. Accordingly, for example, when the user of the vehicle 100 can grasp the situation of the head of the traffic congestion, the sending of the captured image can be stopped.

Also, the request information sending section 214 may also send the request information by which the head zone 410 is specified as a zone at which the captured image is to be sent. Accordingly, the captured image can be sent to the vehicle 302 only during a period in which the vehicle 302 travels within the head zone 410.

Figure 6:
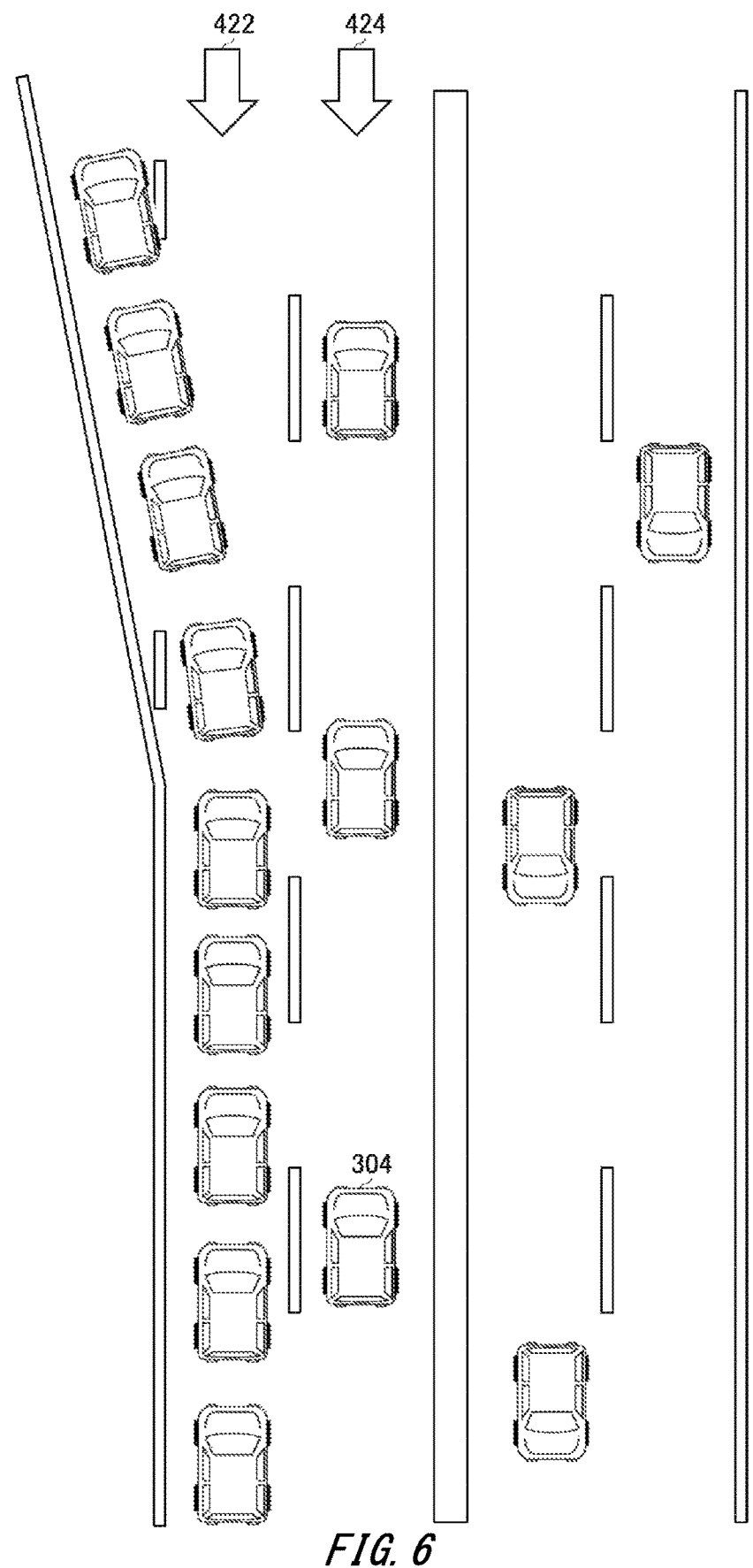
FIG. 6 schematically shows one example of a vehicle 304 that sends a captured image to the vehicle 100.

FIG. 6 schematically shows one example of a vehicle 304 that sends the captured image. In the example shown in FIG. 6, the vehicle 304 travels on a parallel lane 424 that is in parallel with a vehicle-line lane 422 at which a line of vehicles is formed.

The request information sending section 214 may send the request information to the vehicle 304, and the captured-image receiving section 216 may receive the captured image from the vehicle 304. Because the captured image captured by the vehicle 304 includes the line of the vehicles, by causing the display section 120 to display the captured image received by the captured-image receiving section 216, the user can grasp the situation of the line.

Also, the request information sending section 214 may also send the request information by which a zone on which the vehicle travels in parallel with the line is specified as a zone at which the captured image is to be sent. Accordingly, the captured image can be sent to the vehicle 304 only during a period in which the vehicle 304 travels in parallel with the line.

Figure 7:
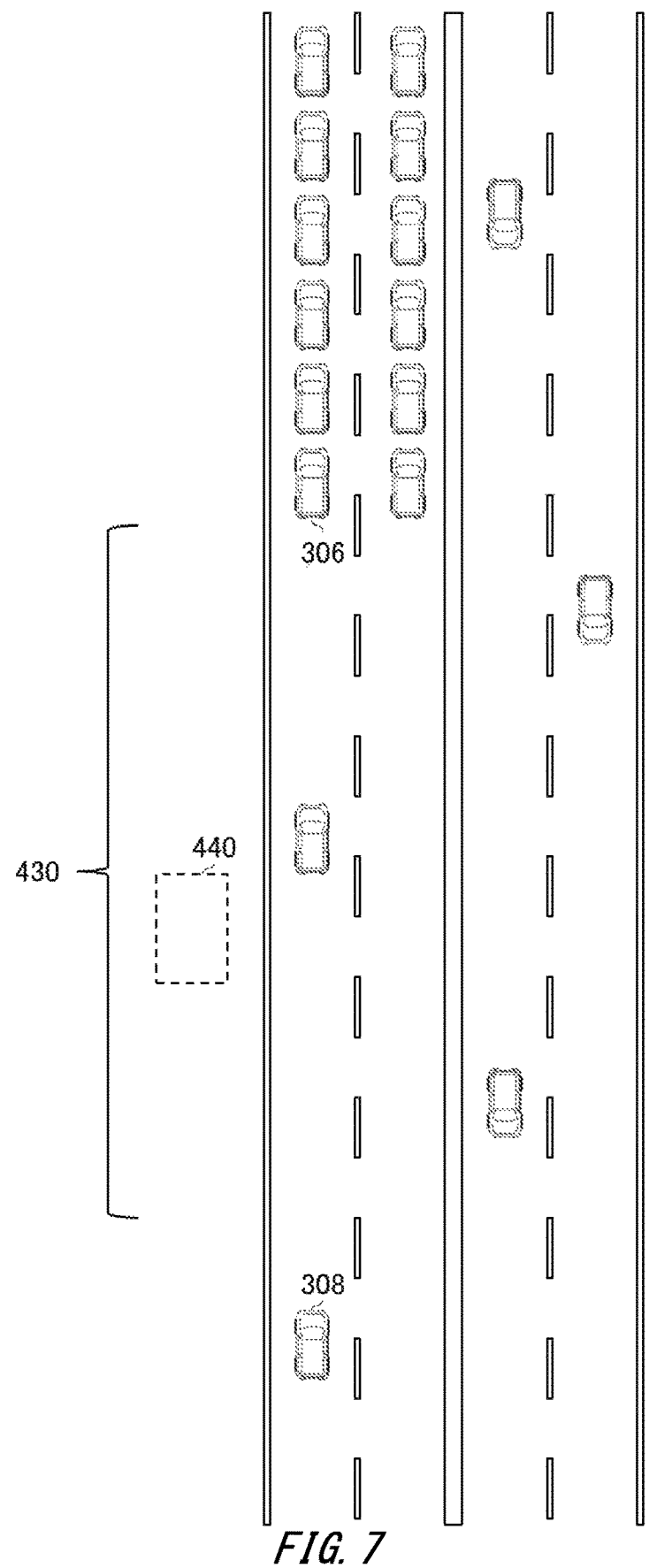
FIG. 7 schematically shows one example of a vehicle 308 that sends a captured image to the vehicle 100.

FIG. 7 schematically shows one example of a vehicle 308 that sends a captured image. In the example shown in FIG. 7, the vehicle 308 travels right before the vehicle 306 that is the end of the traffic congestion by a predetermined distance 430 or more.

The request information sending section 214 may send the request information to the vehicle 308, and the captured-image receiving section 216 may receive the captured image from the vehicle 308. By causing the display section 120 to display the captured image received by the captured-image receiving section 216, the user can grasp the situation from a location right before the traffic congestion to a location reaching the traffic congestion. Accordingly, the user can grasp in advance that there is a store 440 such as a convenience store right before the traffic congestion. Also, for example, when there is a road (no shown in the drawing) right before the traffic congestion by which the traffic congestion can be bypassed, the user can grasp the road in advance.

The request information sending section 214 may also send the request information by which any zone on which the vehicle 308 travels until the vehicle 308 is located at the end of the traffic congestion is specified as a zone at which a captured image is to be sent. Accordingly, the captured image can be sent to the vehicle 308 only during a period until the vehicle reaches the traffic congestion.

The control device 200 may also determine whether or not the traffic congestion exists in the vicinity of the self-vehicle, and send the request information to a vehicle that is related to the traffic congestion in the vicinity of the self-vehicle. For example, the control device 200 may send the request information to a vehicle that is located within the traffic congestion in the vicinity of the self-vehicle, a vehicle that is located within the head zone of the traffic congestion in the vicinity of the self-vehicle, a vehicle that is located at the end of the traffic congestion in the vicinity of the self-vehicle, a vehicle that travels behind the traffic congestion in the vicinity of the self-vehicle, a vehicle that travels on a parallel lane that is in parallel with a vehicle-line lane at which the traffic congestion is occurring in the vicinity of the self-vehicle, and the like.

Figure 8:
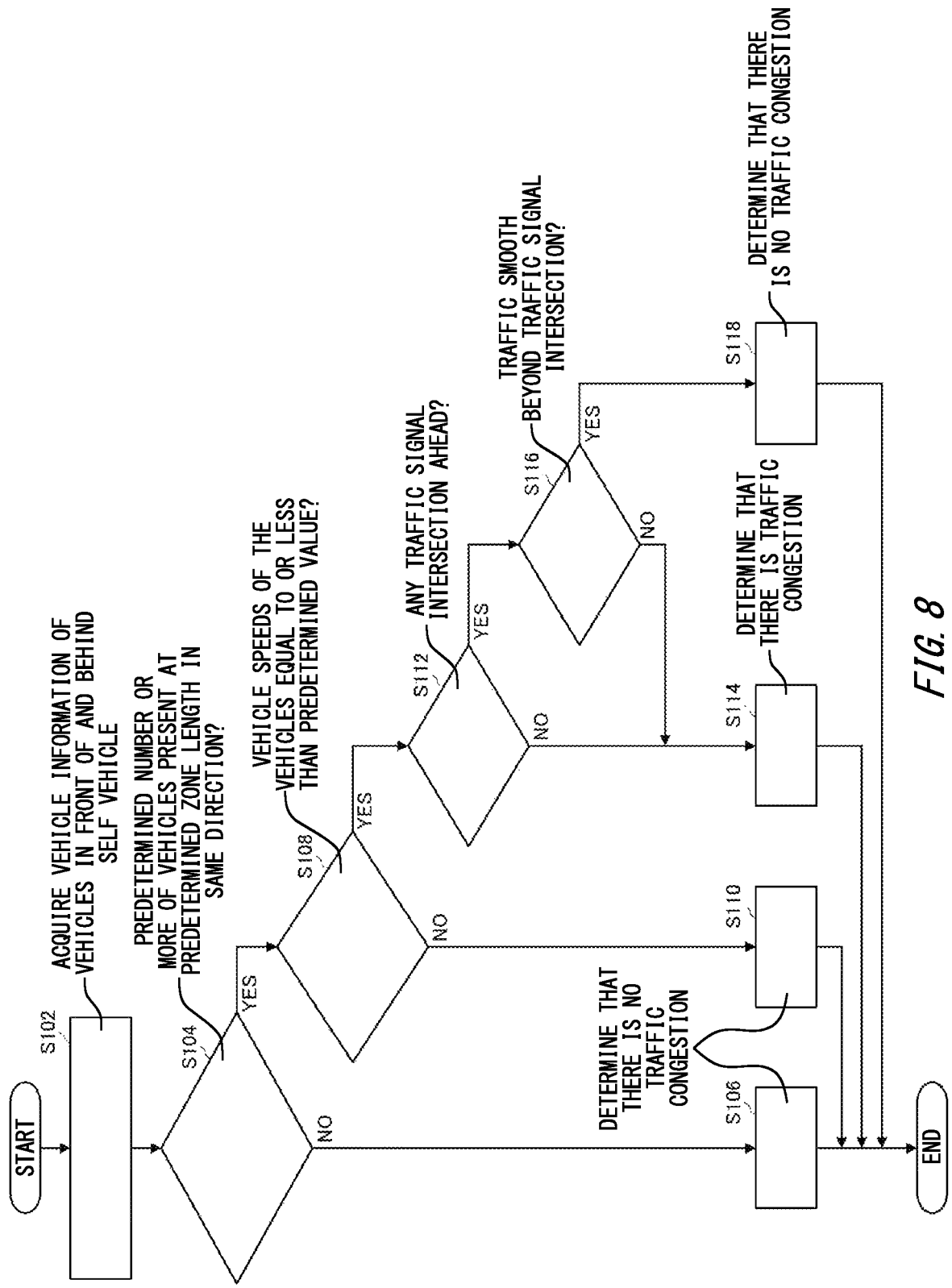
FIG. 8 schematically shows one example of a process flow of determining whether or not traffic congestion exists in the vicinity of a self-vehicle by the control device 200.

FIG. 8 schematically shows one example of a process flow of determining, by the control device 200, whether or not the traffic congestion exists in the vicinity of the self-vehicle. For example, the control device 200 may perform the process shown in FIG. 8 according to an instruction of an occupant who is riding on the self-vehicle.

In a step 102 (the term "step" may be abbreviated to S), the travelling situation determining section 212 acquires, from the storage section 204, vehicle information of vehicles in front of and behind the self-vehicle. In S104, the travelling situation determining section 212 determines whether or not there is a predetermined number of vehicles or more at a predetermined length of zone in the same direction. When it is determined as NO, the process proceeds to S106, and when it is determined as YES, the process proceeds to S108. In S106, the travelling situation determining section 212 determines that there is no traffic congestion in the vicinity of the self-vehicle. For example, the travelling situation determining section 212 may also notify, via a display control section 218, an occupant that there is no traffic congestion in the vicinity of the self-vehicle.

In S108, the travelling situation determining section 212 determines whether or not vehicle speeds of vehicles that are determined in S104 as being at the predetermined length of zone in the same direction are equal to or less than a predetermined value. The travelling situation determining section 212 may determine whether or not the highest value of the vehicle speeds of the vehicles is equal to or less than the predetermined value.

When it is determined that the highest value is not equal to or less than the predetermined value, the process proceeds to S110, and when it is determined that the highest value is equal to or less than the predetermined value, the process proceeds to S112. In S110, because the tailgating or an adjacent lane, not the traffic congestion, is considered as a reason why there is a predetermined number of vehicles or more at the predetermined length of zone in the same direction, the travelling situation determining section 212 determines that there is no traffic congestion.

In S112, the travelling situation determining section 212 determines whether or not there is a traffic light intersection ahead the vehicles. For example, the travelling situation determining section 212 may determine whether or not there is a traffic light intersection ahead the vehicles by referring to map data. The map data may be stored in the storage section 204. When it is determined as NO, the process proceeds to S114, and when it is determined as YES, the process proceeds to S116.

In S114, the travelling situation determining section 212 determines that there is traffic congestion in the vicinity of the self-vehicle. In S116, the travelling situation determining section 212 determines whether or not the traffic is smooth beyond the traffic light intersection that is determined in S112 as being present. For example, the travelling situation determining section 212 reads, from the storage section 204, vehicle information of one or more vehicles that travel on a location beyond the traffic light intersection, and when vehicle speeds of the one or more vehicles are faster than a predetermined value, the travelling situation determining section 212 determines that the traffic is smooth beyond the traffic light intersection. When it is determined that the traffic is not smooth, the process proceeds to S114, and when it is determined that the traffic is smooth, the process proceeds to S118. In S118, because traffic light waiting, not the traffic congestion, is considered as a reason why there is a predetermined number of vehicles or more at the predetermined length of zone in the same direction, the travelling situation determining section 212 determines that there is no traffic congestion in the vicinity of the self-vehicle.

The control device 200 may also receive request information from another vehicle, capture an image according to the request information, and send the captured image to the other vehicle. For example, the control device 200 determines whether or not there is traffic congestion in the vicinity of the self-vehicle, and if there is the traffic congestion, the control device 200 determines a relation between the self-vehicle and the traffic congestion to capture an image that is according to the request information. In this case, the travelling situation determining section 212 may determine a relation between the self-vehicle and the traffic congestion. Also, the control device 200 may include a request information receiving section that receives the request information, and a captured-image sending section that sends the captured image captured by the image capturing section 140.

For example, if the request information is received from another vehicle when the self-vehicle is located within a head zone of the traffic congestion, the control device 200 starts to capture an image and sends the captured image to the other vehicle. Also, for example, if the request information is received from another vehicle when the self-vehicle travels on a parallel lane that is in parallel with a vehicle-line lane at which a line of vehicles is formed, the control device 200 may start to capture an image and send the captured image to the other vehicle. Also, for example, if the request information is received from another vehicle when the self-vehicle travels behind the traffic congestion, the control device 200 starts to capture an image and sends the captured image to the other vehicle.

Figure 9:
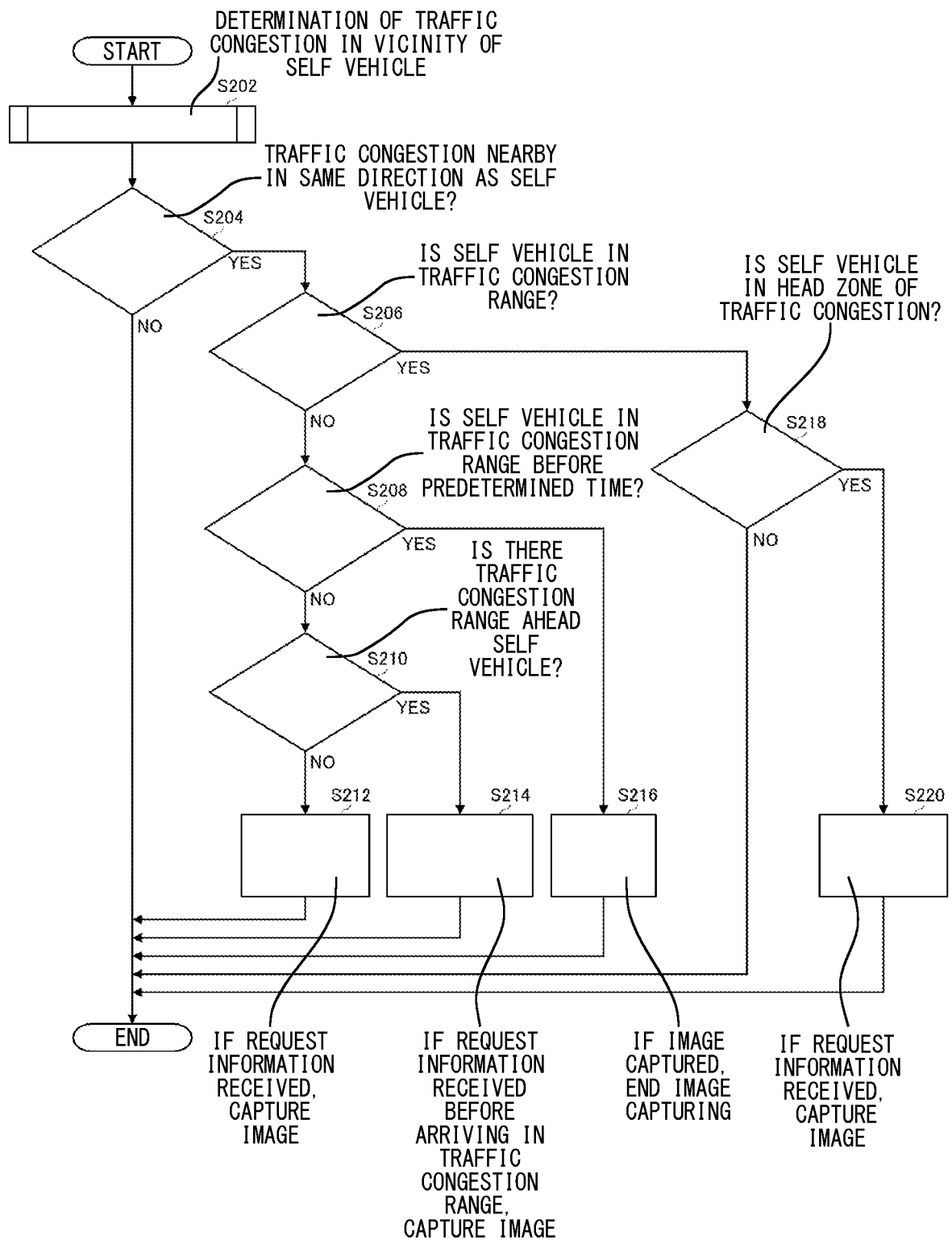
FIG. 9 schematically shows one example of a process flow of the control device 200.

FIG. 9 schematically shows one example of a process flow of the control device 200. Here, a process flow is shown in a case where the control device 200 determines whether or not there is traffic congestion in the vicinity of the self-vehicle, and if there is the traffic congestion, the control device 200 determines a relation between the self-vehicle and the traffic congestion and captures an image according to the request information.

In S202, the control device 200 performs a process of determining whether or not there is traffic congestion in the vicinity of the self-vehicle as shown in FIG. 8. When there is no traffic congestion in the same direction as the self-vehicle in the vicinity of the self-vehicle ("NO" in S204), the process is ended, and when there is the traffic congestion ("YES" in S204), the process proceeds to S206.

In S206, the travelling situation determining section 212 determines whether or not the self-vehicle is within a range of the traffic congestion. When it is determined as NO, the process proceeds to S208, and when it is determined as YES, the process proceeds to S218.

In S208, the travelling situation determining section 212 determines whether or not the self-vehicle was within the traffic congestion range before a predetermined time. When it is determined as NO, the process proceeds to S210, and when it is determined as YES, the process proceeds to S216.

In S210, the travelling situation determining section 212 determines whether or not there is the traffic congestion range ahead the self-vehicle. When it is determined as NO, the process proceeds to S212, and when it is determined as YES, the process proceeds to S214.

In S212, the travelling situation determining section 212 determines that the self-vehicle travels on a parallel lane that is in parallel with a lane at which the traffic congestion exists. When the request information receiving section receives the request information that is to the vehicle that travels on the parallel lane in parallel with the vehicle-line lane at which a line of vehicles is formed, the captured-image sending section sends a captured image of the traffic congestion to the sending source of the request information.

In S214, the travelling situation determining section 212 determines that the self-vehicle travels behind the traffic congestion. When the request information receiving section receives the request information to the vehicle that travels behind the traffic congestion before the self-vehicle reaches the traffic congestion, the captured-image sending section sends, to the sending source of the request information, captured images that are captured until the self-vehicle reaches the traffic congestion.

In S216, the travelling situation determining section 212 determines that the self-vehicle passes through the traffic congestion and travels in front of the traffic congestion. Here, it is assumed that if the captured images have been sent when the self-vehicle travels within the head zone of the traffic congestion, the image capturing is ended.

In S218, the travelling situation determining section 212 determines whether or not the self-vehicle is in the head zone of the traffic congestion. When it is determined as NO, the process is ended, and when it is determined as YES, the process proceeds to S220. In S220, when the request information receiving section receives the request information that is to the vehicle located within the head zone of the traffic congestion, the captured-image sending section sends the captured image to the sending source of the request information.

Figure 10:
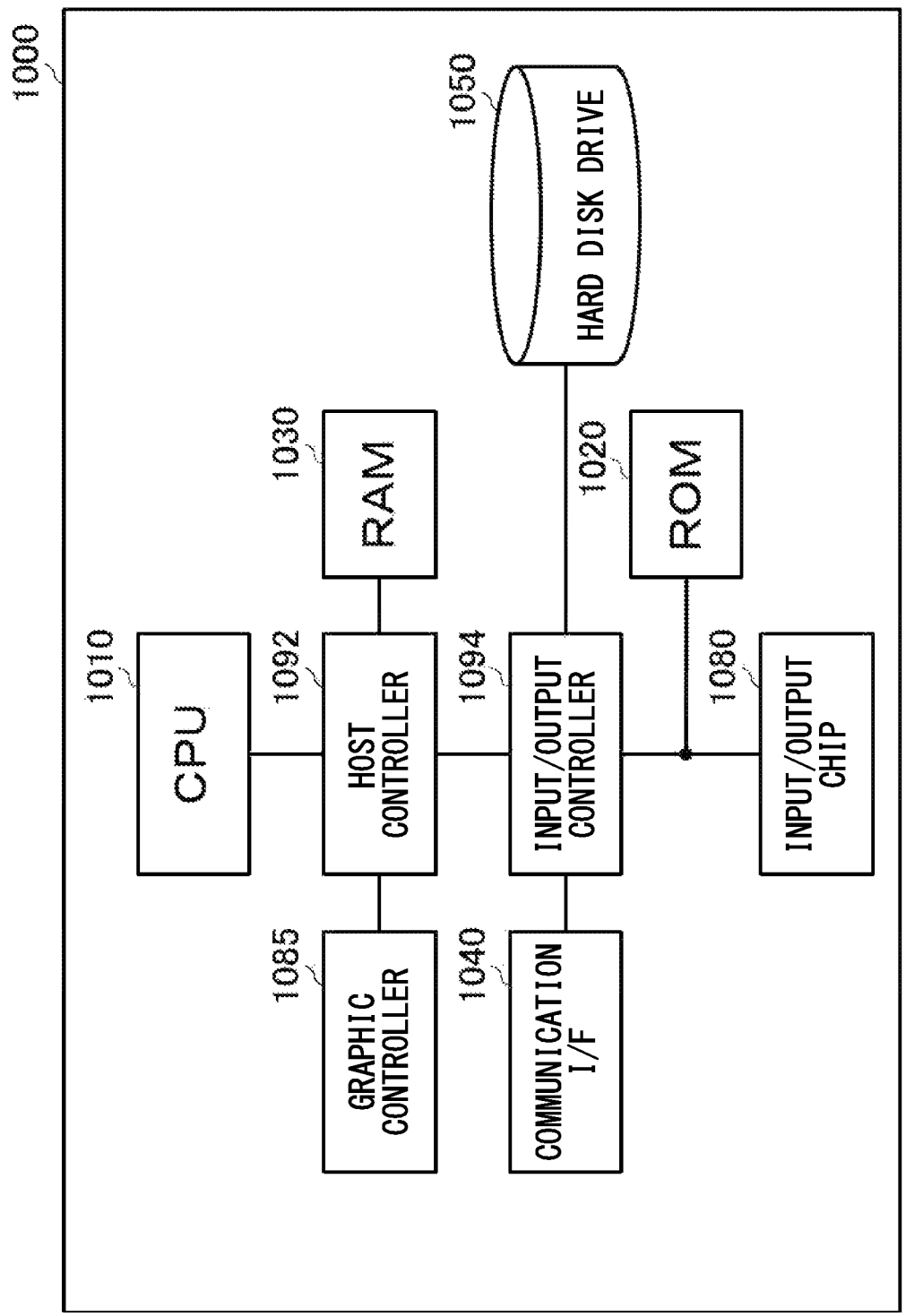
FIG. 10 schematically shows one example of a hardware configuration of a computer 1000 that functions as the control device 200.

FIG. 10 schematically shows one example of a computer 1000 that functions as the control device 200. The computer 1000 according to the present embodiment includes a CPU-surrounding section including a CPU 1010, a RAM 1030, and a graphic controller 1085, which are connected to each other by a host controller 1092, and an input/output section including a ROM 1020, a communication I/F 1040, a hard disk drive 1050, and an input/output chip 1080, which are connected to the host controller 1092 by an input/output controller 1094.

The CPU 1010 operates based on programs stored in the ROM 1020 and the RAM 1030 to control each section. The graphic controller 1085 acquires image data generated such as by the CPU 1010 on a frame buffer provided in the RAM 1030, and causes the image data to be displayed on a display. Instead of this, the graphic controller 1085 may itself include a frame buffer for storing image data generated such as by the CPU 1010.

The communication I/F 1040 performs communication with other devices via a wired or wireless network. Also, the communication I/F 1040 also functions as hardware for performing communication. The hard disk drive 1050 stores programs and data used by the CPU 1010.

The ROM 1020 stores a boot program executed by the computer 1000 at startup, programs dependent on hardware of the computer 1000, and the like. The input/output chip 1080 connects various input/output devices to the input/output controller 1094 such as via a parallel port, a serial port, a keyboard port, and a mouse port, for example.

Programs provided to the hard disk drive 1050 via the RAM 1030 are provided by a user in a form stored in a recording medium such as an IC card. The programs are read out from the recording medium, installed onto the hard disk drive 1050 via the RAM 1030, and executed on the CPU 1010.

The programs installed onto the computer 1000 for causing the computer 1000 to function as the control device 200 may instruct the CPU 1010 or the like to cause the computer 1000 to respectively function as each section of the control device 200. Information processing described in these programs are read by the computer 1000 to function as the vehicle information collecting section 202, the storage section 204, the travelling situation determining section 212, the request information sending section 214, the captured-image receiving section 216, and the display control section 218, which are specific means in which software and the above-described various hardware resources cooperate. Also, the information processing described in these programs are read by the computer 1000 to function as the request information receiving section and the captured-image sending section, which are specific means in which software and the above-described various hardware resources cooperate. Further, these specific means implement operations or processing of information according to the purpose of use of the computer 1000 in the present embodiment, and the control device 200 is thereby constructed to be specific for the purpose of use.

While in the above-described embodiment the control device 200 mounted on the vehicle 100 has been described as one example of the display control device, there is no such limitation and, for example, a communication terminal owned by the user who is riding on the vehicle 100 may also function as the display control device.

Figure 11:
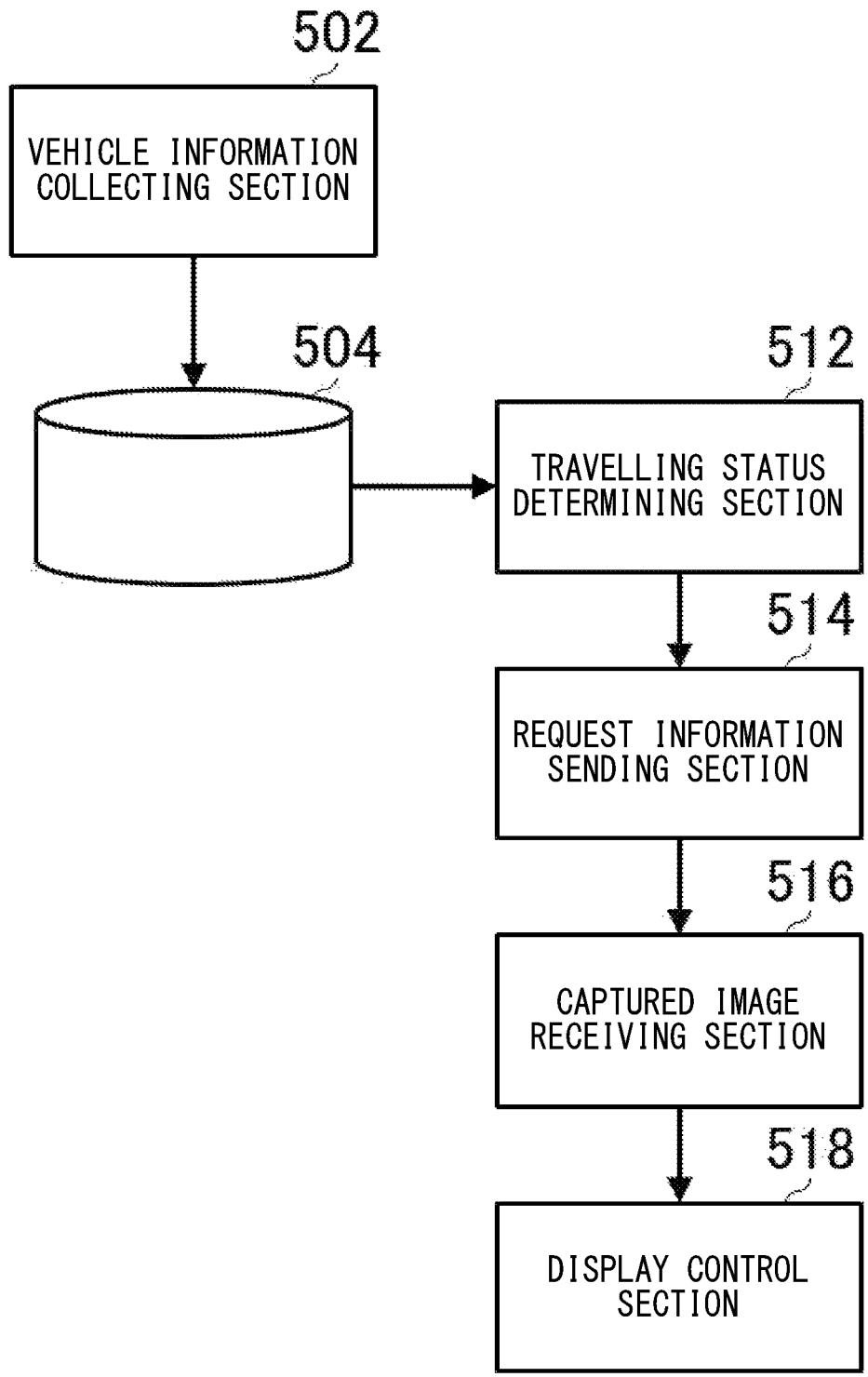
FIG. 11 schematically shows one example of a functional configuration of a communication terminal 500.

FIG. 11 schematically shows one example of a functional configuration of a communication terminal 500. The communication terminal 500 includes a vehicle information collecting section 502, a storage section 504, a travelling situation determining section 512, a request information sending section 514, a captured-image receiving section 516 and a display control section 518. Here, different points in the process contents from the control device 200 shown in FIG. 4 are mainly described.

The vehicle information collecting section 502 collects the vehicle information. The vehicle information collecting section 502 may receive vehicle information that is periodically sent by another vehicle 100. Also, the vehicle information collecting section 502 may also receive vehicle information of another vehicle 100 from a vehicle 100 (which may be described as the self-vehicle) on which a user who owns the communication terminal 500 is riding. For example, the vehicle information collecting section 502 receives the vehicle information of another vehicle 100 from the self-vehicle via short-range wireless communication such as Bluetooth (registered trademark). In this way, the communication between each component included in the communication terminal 500 and the outside of the vehicle 100 may also be performed via the vehicle 100. The vehicle information collecting section 502 stores the collected vehicle information in the storage section 504.

The travelling situation determining section 512 determines travelling situations of a plurality of vehicles 100 based on vehicle information that is stored in the storage section 504. The request information sending section 514 sends, to a vehicle in a travelling situation that is determined by the travelling situation determining section 512 and that satisfies a predetermined condition, the request information for requesting to send a captured image. The request information sending section 514 may include the identification information that indicates the communication terminal 500 in the request information and send the information to the vehicle.

The captured-image receiving section 516 receives the captured image. The captured-image receiving section 516 receives the captured image that is sent by the vehicle according to request information, the vehicle receiving the request information sent by the request information sending section 514. The display control section 518 may cause a display included in the communication terminal 500 to display the captured image that is received by the captured-image receiving section 516. Also, the display control section 518 may also send the captured image to the control device 200 of the self-vehicle and cause the display section 120 to display the sent image.

Figure 12:
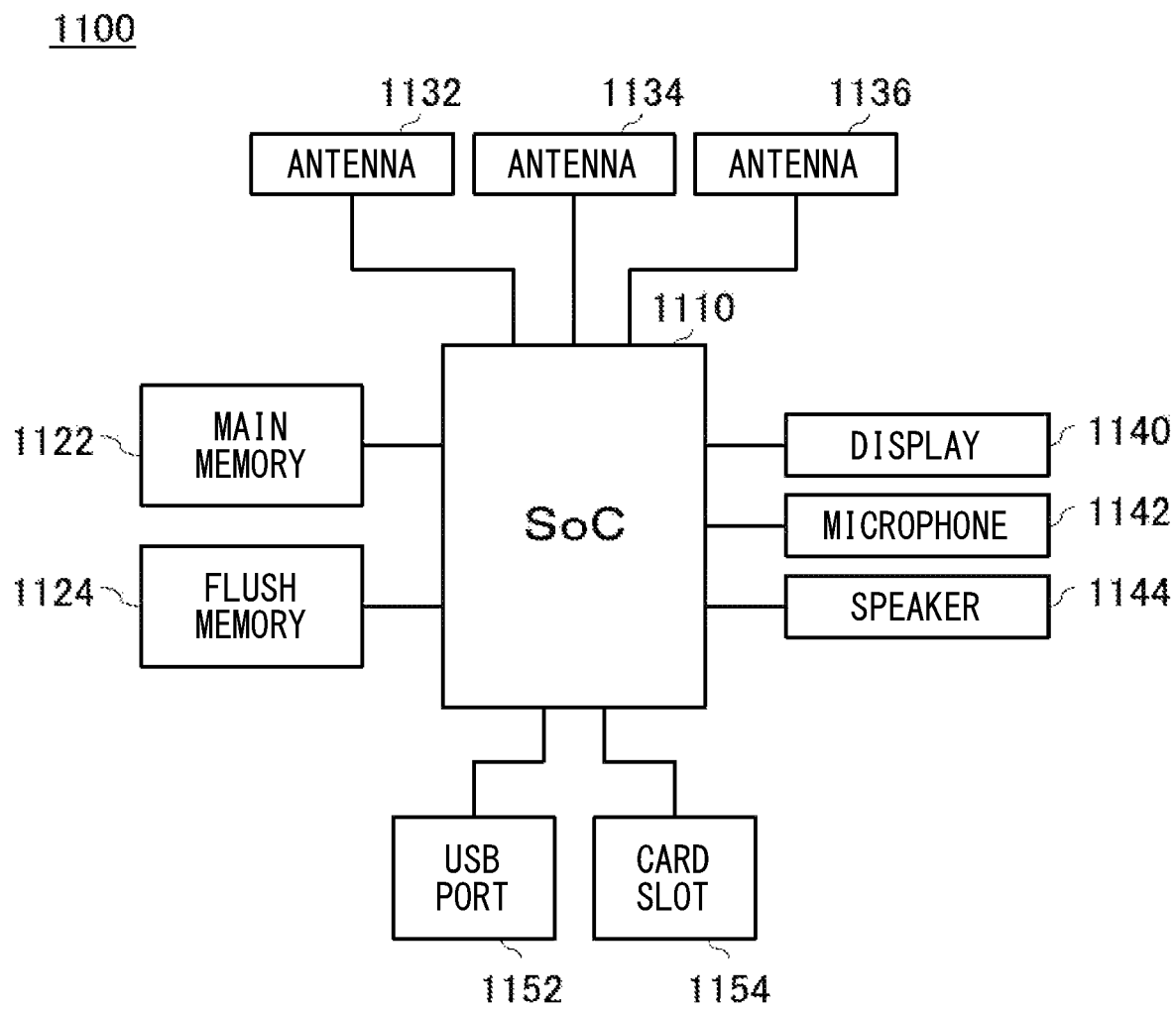
FIG. 12 schematically shows one example of a hardware configuration of a computer 1100 that functions as the communication terminal 500.

FIG. 12 shows one example of a hardware configuration of a computer 1100 that functions as the communication terminal 500. The computer 1100 according to the present embodiment includes a SoC 1110, a main memory 1122, a flash memory 1124, an antenna 1132, an antenna 1134, an antenna 1136, a display 1140, a microphone 1142, a speaker 1144, a USB port 1152, and a card slot 1154.

The SoC 1110 operates based on programs stored in the main memory 1122 and the flash memory 1124 to control each section. Antenna 1132 is a so-called cellular antenna. The antenna 1134 is a so-called Wi-Fi antenna. The antenna 1136 is an antenna for so-called short-range wireless communication such as Bluetooth (registered trademark). The SoC 1110 may use the antenna 1132, the antenna 1134, and the antenna 1136 to implement various communication functions. The SoC 1110 may receive programs used by the SoC 1110 using the antenna 1132, the antenna 1134, or the antenna 1136, and store the programs in the flash memory 1124.

The SoC 1110 may use the display 1140 to implement various display functions. The SoC 1110 may use the microphone 1142 to implement various audio input functions. The SoC 1110 may use the speaker 1144 to implement various audio output functions.

The USB port 1152 implements USB connection. The card slot 1154 implements connection with various cards such as a SD card. The SoC 1110 may receive programs used by the SoC 1110 from equipment or a memory connected to the USB port 1152 and from a card connected to the card slot 1154, and store the programs in the flash memory 1124.

The programs installed onto the computer 1100 for causing the computer 1100 to function as the communication terminal 500 may instruct the SoC 1110 or the like to cause the computer 1100 to respectively function as each section of the communication terminal 500. Information processing described in these programs are read by the computer 1100 to function as the vehicle information collecting section 502, the storage section 504, the travelling situation determining section 512, the request information sending section 514, the captured-image receiving section 516 and the display control section 518, which are specific means in which software and the above-described various hardware resources cooperate. Further, these specific means implement operations or processing of information according to the purpose of use of the computer 1100 in the present embodiment, and accordingly, the communication terminal 500 is constructed to be specific for the purpose of use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 . . . network; 21, 22, 23, 24, 25, 26, 27, 28 . . . vehicle; 30 . . . traffic congestion range; 40 . . . predetermined distance; 42 . . . zone; 100 . . . vehicle; 110 . . . manipulation section; 120 . . . display section; 130 . . . wireless communication section; 140 . . . image capturing section; 150 . . . GNSS receiving section; 160 . . . sensor section; 200 . . . control device; 202 . . . vehicle information collecting section; 204 . . . storage section; 212 . . . travelling situation determining section; 214 . . . request information sending section; 216 . . . captured-image receiving section; 218 . . . display control section; 300 . . . vehicle management device; 302 . . . vehicle; 304 . . . vehicle; 306 . . . vehicle; 308 . . . vehicle; 410 . . . head zone; 422 . . . vehicle-line lane; 424 . . . parallel lane; 430 . . . predetermined distance; 440 . . . store; 500 . . . communication terminal; 502 . . . vehicle information collecting section; 504 . . . storage section; 512 . . . travelling situation determining section; 514 . . . request information sending section; 516 . . . captured-image receiving section; 518 . . . display control section; 1000 . . . computer; 1010 . . . CPU; 1020 . . . ROM; 1030 . . . RAM; 1040 . . . communication I/F; 1050 . . . hard disk drive; 1080 . . . input/output chip; 1085 . . . graphic controller; 1092 . . . host controller; 1094 . . . input/output controller; 1100 . . . computer; 1110 . . . SoC; 1122 . . . main memory; 1124 . . . flash memory; 1132 . . . antenna; 1134 . . . antenna; 1136 . . . antenna; 1140 . . . display; 1142 . . . microphone; 1144 . . . speaker; 1152 . . . USB port; 1154 . . . card slot

What is claimed is:

1. A control device comprising:
a vehicle information collecting section, included in a first vehicle, configured to collect vehicle information that is sent by each of a plurality of vehicles and that includes location information indicating a location of each of the plurality of vehicles;
a travelling situation determining section, included in the first vehicle, configured to determine a current traffic congestion situation of at least one vehicle among the plurality of vehicles based on the vehicle information of each of the plurality of vehicles; and
a captured-image receiving section, included in the first vehicle, configured to receive, without going through a network, via a vehicle-vehicle direct communication or vehicle-road-vehicle communication from a second vehicle that is located at a predetermined position associated with the current traffic congestion situation, a captured image that is captured by the second vehicle that is located at the predetermined position.

2. The control device according to claim 1, the vehicle information includes a travelling speed of the vehicle.

3. The control device according to claim 1, wherein the captured-image receiving section receives the captured images from the second vehicle that is located within a head zone of the current traffic congestion.

4. The control device according to claim 3, wherein the captured-image receiving section receives the captured image from the second vehicle that is located before a head vehicle of the current traffic congestion by a predetermined number of vehicles.

5. The control device according to claim 3, comprising a request information sending section configured to send, to the second vehicle that is located at the predetermined position associated with the current traffic congestion situation, request information for requesting to send the captured image, wherein
the request information sending section is configured to send, to the second vehicle that is located within the head zone of the current traffic congestion, the request information by which the head zone is specified as a zone at which a captured image is to be sent.

6. The control device according to claim 1, wherein
the captured-image receiving section receives, from the second vehicle travelling on a parallel lane that is in parallel with a vehicle-line lane at which a line of vehicles is formed, a captured image that is obtained by capturing an image of the line.

7. The control device according to claim 6, comprising a request information sending section configured to send, to the second vehicle that is located at the predetermined position associated with the current traffic congestion situation, request information for requesting to send the captured image, wherein
the request information sending section is configured to send, to a second vehicle that travels on the parallel lane, the request information by which a zone on which the vehicle travels in parallel with the line is specified as a zone at which a captured image is to be sent.

8. The control device according to claim 1, wherein the captured-image receiving section is configured to receive a captured image from the second vehicle that travels behind the current traffic congestion.

9. The control device according to claim 8, wherein the captured-image receiving section is configured to receive, from the second vehicle that travels behind the current traffic congestion, a captured image that is obtained by capturing an image of the current traffic congestion from behind the current traffic congestion.

10. The control device according to claim 8, wherein the captured-image receiving section is configured to receive a captured image from the second vehicle that travels right before an end of the current traffic congestion by a predetermined distance or more.

11. The control device according to claim 8, comprising a request information sending section configured to send, to the second vehicle that is located at the predetermined position associated with the current traffic congestion situation, request information for requesting to send the captured image, wherein
the request information sending section is configured to send, to the second vehicle that travels behind the current traffic congestion, the request information by which any zone on which the vehicle travels until the vehicle is located at the end of the current traffic congestion is specified as a zone at which a captured image to be sent.

12. The control device according to claim 1, comprising a request information sending section configured to send, to the second vehicle that is located at the predetermined position associated with the current traffic congestion situation, request information for requesting to send the captured image, wherein
the captured-image receiving section is configured to receive, from the second vehicle that has received the request information, a captured image captured by the second vehicle.

13. The control device according to claim 1, wherein
the travelling situation determining section is configured to determine the current traffic congestion situation without using the captured image.

14. The control device according to claim 1, wherein
the travelling situation determining section is configured to
determine whether or not there is a predetermined number of vehicles or more at a predetermined length of zone in the same direction, and
determine that there is no traffic congestion in response to determining that there is no predetermined number of vehicles or more at the predetermined length of zone in the same direction.

15. The control device according to claim 14, wherein
the travelling situation determining section is configured to, after determining that there is the predetermined number of vehicles or more at the predetermined length of zone in the same direction, determine whether or not vehicle speeds of vehicles that are determined as being at the predetermined length of zone in the same direction are equal to or less than a predetermined value, and determine that there is no traffic congestion in response to determining that vehicle speeds of vehicles that are determined as being at the predetermined length of zone in the same direction are not equal to or less than a predetermined value.

16. The control device according to claim 15, wherein
the travelling situation determining section is configured to, after determining that vehicle speeds of vehicles that are determined as being at the predetermined length of zone in the same direction are equal to or less than a predetermined value, determine whether or not there is a traffic light intersection ahead the vehicles, and determine that there is a traffic congestion in response to determining that there is no traffic light intersection ahead the vehicles.

17. The control device according to claim 16, wherein the travelling situation determining section is configured to, after determining that there is a traffic light intersection ahead the vehicles, determine whether or not a traffic is smooth beyond the traffic light intersection that is determined as being present.

18. The control device according to claim 17, wherein the travelling situation determining section is configured to determine that there is a traffic congestion in response to determining that a traffic is not smooth beyond the traffic light intersection, and determine that there is no traffic congestion in response to determining that a traffic is smooth beyond the traffic light intersection.

19. The control device according to claim 1, wherein the current traffic congestion situation is along a route traveled by the first vehicle.

20. A computer readable storage medium that stores a program for causing a computer to function as:
- a vehicle information collecting section configured to collect vehicle information that is sent by each of a plurality of vehicles and that includes location information indicating a location of each of the plurality of vehicles;
- a travelling situation determining section configured to determine a current traffic congestion situation of at least one vehicle among the plurality of vehicles based on the vehicle information of each of the plurality of vehicles; and
- a captured-image receiving section configured to receive, without going through a network, via a vehicle-vehicle direct communication or vehicle-road-vehicle communication from a second vehicle that is located at a predetermined position associated with the current traffic congestion situation, a captured image captured by the second vehicle that is located at the predetermined position, wherein the computer is included in a first vehicle.

* * * * *